Patented Jan. 12, 1960

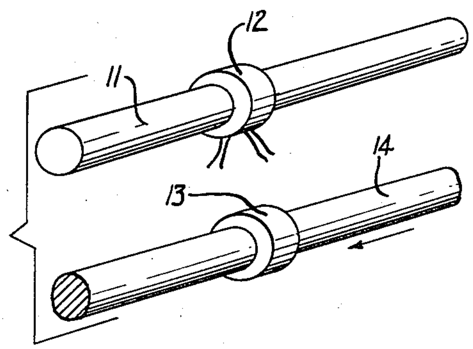
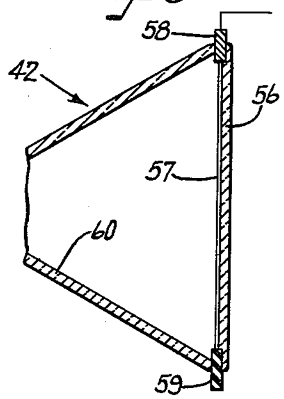
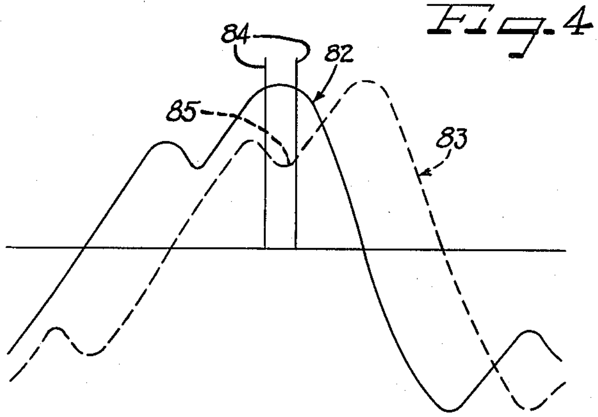
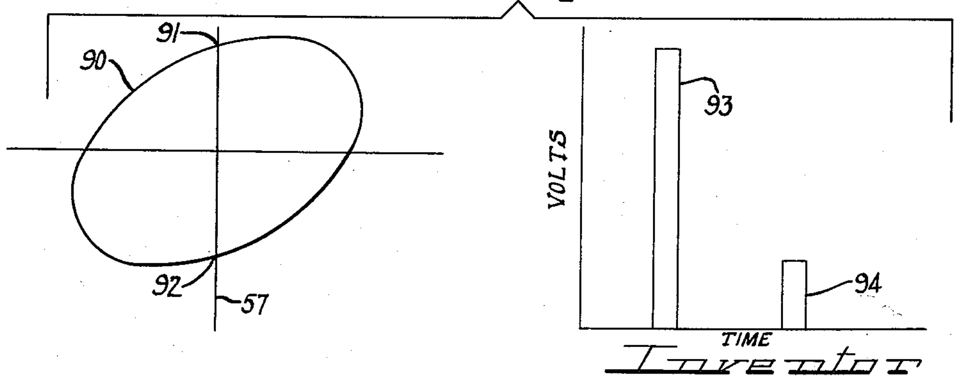
Inventor
Friedrich M. O. Foerster
by Hill, Sherman, Meroni, Gross & Simpson Attys CATHODE RAY TUBE CIRCUITS
Filed Nov. 28, 1958
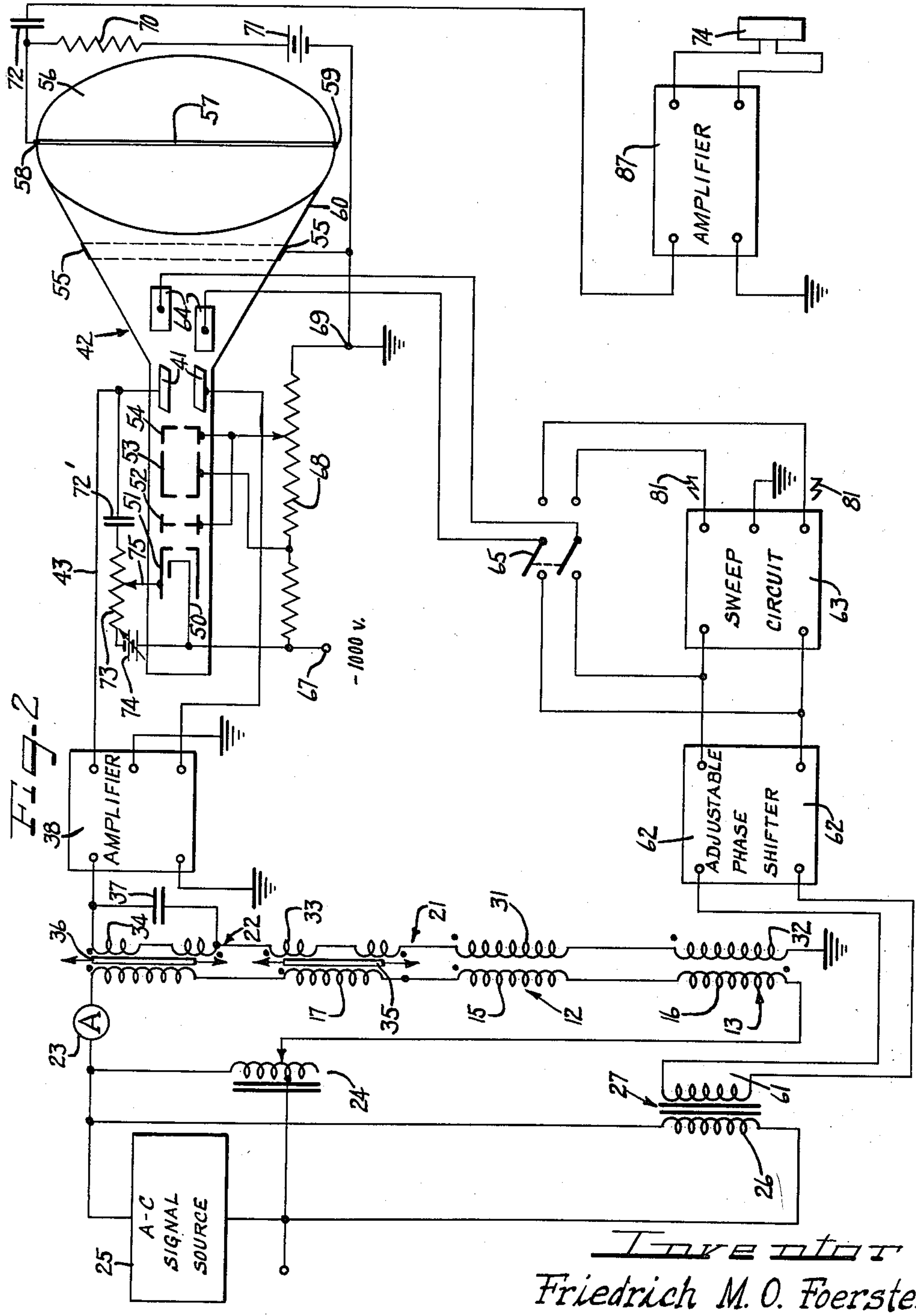
Inventor
Friedrich M. O. Foerster
by Hill, Sherman, Meroni, Gross & Simpson Attys United States Patent Office 2,921,229

2,921,229

CATHODE RAY TUBE CIRCUITS

Friedrich M. O. Foerster, Reutlinger, Germany

Application November 28, 1958, Serial No. 777,121

10 Claims. (Cl. 315—22)

This invention relates to electron beam device circuitry for analyzing various characteristics of electrical wave-forms. More particularly, this invention relates to a cathode ray tube circuit for analyzing wave-forms typically produced in magnetic or other testing apparatus.

One particular form of apparatus in which the present invention may be used comprises a system employing balanced magnetic detectors wherein a certain portion of the signal wave-form derived across the output of the detectors is indicative of a particular characteristic of the material being tested. The apparatus must be so arranged that it responds only to this portion of the wave-form when the associated characteristic is being tested. Thus, when the response indicates that the material under test fails to meet a predetermined specification, this failure is automatically indicated by an output signal which may be utilized to actuate automatic equipment for rejecting the material and/or actuating associated alarm equipment.

In particular, this system includes a pair of balanced transformer detectors, each transformer having a primary and secondary with the primaries serially-connected and energized by a source of alternating current signal, and the secondary windings also being serially connected so that substantially no voltage is derived across the serially-connected windings when the loads inductively coupled to the respective transformers exhibit substantially the same characteristics. Typically, one transformer may be a standard transformer and the other a test transformer. A specimen having the desired value of the characteristic to be tested is placed in the center of the standard transformer and when the test specimen occupies a corresponding position in the center of the test transformer, the voltage wave-form derived across the connected together secondary windings is indicative of the deviation of the characteristics of the test specimen from those of the standard. If, for example, only the hardness of the specimen is being tested, only a portion of the signal wave formed derived across the secondary windings will be relevant. Whether the sample specimen meets the required criterion could, for example, be ascertained by examining the signal wave-form on a conventional oscilloscope and visually observing whether the relevant portion of the signal wave-form is within the desired tolerances. An operator may then manually indicate the results of the inspection to actuate equipment which rejects the specimen and/or actuates an alarm. With careful inspectors and at relatively slow rates, this method of inspection is satisfactory. However, even careful inspectors are likely to make errors after long periods of continuously monitoring an oscilloscope screen. Moreover, the number of inspections they can carefully make in a specified time interval is limited.

The present invention contemplates and has as an object the provision of an electron beam device circuit for use in cooperation with a magnetic testing system which automatically responds to only a selected portion of a signal wave-form to provide an indication of the value of this portion.

Another object of this invention is the provision of circuitry which permits the amplitude of a selected portion of a signal wave-form to be automatically monitored without continuously viewing an oscilloscope.

Still another object of this invention is the provision of means to directly indicate the difference in phase between two electrical wave-forms by the difference in amplitude of a pair of output signal pulses.

It is a further object of this invention to provide means for monitoring a selected portion of a signal wave-form which apparatus responds with an output indication when the portion thus monitored assumes a predetermined value.

In one particular embodiment of the invention a fine wire or other electrical conductor is installed in a vertical plane behind the face plate of an electron beam device such as a cathode ray tube. The intensity of the electron beam of the tube is controlled in accordance with a signal derived from the tube's vertical deflection system so that the intensity of the electron beam is proportional to the amount of vertical deflection. A sawtooth waveform may be applied to the horizontal deflection system to sweep the beam across the face of the tube on a linear time base. The wire at the back of the face-plate of the tube is connected in circuit with a load impedance so as to produce a pulse of amplitude proportional to the intensity of the electron beam as it crosses the wire and hence also proportional to the amplitude of the vertical deflection signal at the instant when the beam crosses the wire. This vertical deflection signal may, for example, be derived from a magnetic testing system of the type described above in which case the amplitude of the output pulse is a measure of the characteristic being tested. In another application, the horizontal deflection signal may be a sinusoidal wave-form of the same fundamental frequency as the vertical deflection signal. In this latter arrangement, the beam traces out either a straight line, when there is no phase difference between the signals, or an ellipse, when there is a phase difference, and the difference in amplitude, if any, of the output pulses produced as the electron beam crosses the wire during the forward and the retrace portions respectively of its pattern provide an indication of the phase difference between the signals applied to the vertical and horizontal deflection means.

While the novel and distinctive features of the invention are particularly pointed out in the appended claims, a more expository treatment of the invention, in principle and in detail, together with additional objects and advantages thereof, is afforded by the following description and accompanying drawings in which:

Figure 1 illustrates the physical relationship of the balanced transformers of a magnetic testing system when testing the characteristics of a length of rod in comparison to the characteristics of a standard specimen within a standard transformer;

Figure 2 is a combined block-schematic circuit diagram of a representative embodiment of the invention;

Figure 3 is a sectional view, showing how a beam intercepting wire or conductor means may be mounted in a cathode ray tube or other electron beam device;

Figure 4 illustrates a typical wave-form which may be produced using a saw tooth horizontal deflection signal and showing the portion monitored between vertical lines; and Figure 5 is a diagrammatic showing of the trace produced on the face of the cathode ray tube by two signals which are out of phase and of the output pulsed produced by this trace.

With reference now to the drawings and more particularly to Figure 1 thereof, there is illustrated the physical relationship between the standard and the test transformer in a typical magnetic testing system. A standard specimen 11 is positioned within the standard transformer 12 while a length of like rod 14 is passed through test transformer 13 in order to compare the value of a particular characteristic with the standard value exhibited by standard specimen 11.

The physical arrangement of the rest of the system will first be described before discussing its mode of operation.

Referring to Figure 2, the transformers of Figure 1 are shown identified by the same reference numerals and connected in a representative magnetic testing system which embodies the inventive concept of the present invention. The primary windings 15 and 16 of transformers 12 and 13, respectively, are seen to be serially connected to the primaries 17 and 18 of balancing transformers 21 and 22, respectively, and to ammeter 23. Primary 16 is connected to the variable tap of auto-transformer 24 whose fixed tap is connected to A.C. signal source 25, which is also coupled to the primary 26 of phasing transformer 27. One end of auto-transformer 24 is connected to ammeter 23 and the A.C. signal source 25.

The secondary windings 31 and 32 of transformers 12 and 13, respectively, are serially connected to the balanced differentially wound secondary windings 33 and 34 of balancing transformers 21 and 22, respectively. Each of the balancing transformers has a slug, 35 and 36, respectively, which is adjustable as indicated by the arrows. A capacitor 37 is connected across secondary 34 and the tuned circuit thus formed is connected to amplifier 38.

The secondary 61 of phasing transformer 27 is coupled to adjustable phase shifter 62 which supplies a synchronizing signal to sweep circuit 63. The synchronized sweep signal may, in one mode of operation, be coupled by the balanced output lines through double throw double pole switch 65 to the horizontal deflection plates 64 of cathode ray tube 42. In this mode of operation the output signal of amplifier 38 will be displayed on a linear time base on the screen of oscilloscope 42. In another mode of operation the output of adjustable phase shifter 62 may be applied through the other position of double pole double throw switch 65 to the horizontal deflection plates 64 of oscilloscope 42. In this mode of operation, to be described in greater detail below, the output is a measure of the phase difference between the output of the standard A.C. signal source 25 and the output of test transformer 13.

The balanced output from amplifier 38 is applied to the vertical deflection plates 41 of a cathode ray tube or oscilloscope 42. Tube 42 is shown, by way of example only, as being of the post deflection acceleration type and is provided with suitable means for generating a beam of electrons such as a cathode 50. Cathode 50 is followed by any suitable means for controlling the intensity of the electron beam such as the control electrode 51. Following the control electrode there is conventionally an accelerating electrode 52, a focusing electrode 53, and a second accelerating electrode 54. The tube is additionally provided with vertical deflecting plates 41, horizontal deflecting plates 64, and an intensifier or final accelerating electrode 55. Just in back of the face plate or fluorescent screen 56 of tube 42 a fine wire or other conductor 57 is connected between mounting terminals 58 and 59 which may conveniently extend through the envelope 60 of tube 42.

Cathode 50 is connected directly to a source 67 of negative voltage which may conveniently be at about minus 1000 volts. Source 67 is connected through a tapped voltage dividing resistor 68 to a ground terminal 69. Focusing electrodes 53 are connected to a first tap on divider 68 whereas the first and second accelerating anodes are both connected to a second adjustable tap on divider 68. The final accelerating electrode or intensifier 55 is connected to ground terminal 69.

Wire 57 is physically mounted between an electrically insulating terminal 59 and an electrically conducting terminal 58. The terminal 58 is connected through a load resistor 70 to ground terminal 69.

A bias battery 71 may, if desired, be interposed between load resistor 70 and ground terminal 69. A coupling capacitor 72 transmits the output pulses appearing across load resistor 70 to an amplifier 87 the sensitivity of which is adjusted so that it will produce an output only in response to input pulses of a predetermined amplitude. The output of amplifier 87 may be used to actuate a relay 74 or any other control or alarm device.

The output on the positive going lead 43 of amplifier 38, which is directly applied to the deflection plate 41, is also applied through a blocking capacitor 72 to one end of a potentiometer 73, the other end of which is connected through a variable bias battery 74 to cathode 50. The electron beam intensity control electrode 51 is connected to the wiper arm 75 of potentiometer 73. The arrangement of this circuit is such that the intensity of the electron beam is made proportional to the magnitude of the deflection signal applied to vertical deflection plate 41. Adjustable bias battery 74 and wiper arm 75 may be adjusted to set the D.-C. level of the proportionality at any desired value. That is to say, adjustment may be made so that the electron beam is entirely cut off or sent to zero intensity for any desired value of output from amplifier 38.

The manner in which wire 57 is physically mounted in tube 42 is shown in greater detail in Figure 3. Wire 57 may be mounted between conducting terminal 58 and insulating terminal 59 which extend through the glass envelope 60 of tube 42 just in back of the fluorescent screen on face plate 56. Although only a single wire 57 mounted to lie in the vertical axis of deflection of the tube 42 has been shown, it will, of course, be understood that for certain applications wire 57 may be mounted in the horizontal axis of deflection or any slant or angle which may be desirable. Furthermore, if information about a plurality of points on any given waveform is desired, it will of course, be obvious that more than one such wire could be used. In such an arrangement the plurality of wires would, of course, be mounted in spaced apart relationship or would otherwise be insulated from each other.

Having described the physical arrangement of the system, its mode of operation will now be discussed. Although load transformers 12 and 13 are preferably wound so as to be perfectly balanced, slight variations in their constructions result in a slight degree of unbalance. Moreover, the phase of the signal actually derived across the connected-together secondary windings of the balanced transformers when a balanced condition should exist frequently differs from the phase of the signal energizing the primary windings by a non-integral multiple of 180°. In order to eliminate the effects of this inherent unbalance, balancing transformers 21 and 22 are employed with their primary windings energized by the same alternating current signal, but having balanced differentially wound secondary windings such that movement of adjustable slugs 35 and 36 produces voltage across secondary windings 33 and 34 which may vary from a maximum magnitude of one polarity through zero to a maximum of opposite polarity. With capacitor 37 across secondary winding 34, the voltage derived across the tuned circuit thus formed is 90° out of phase with the voltage derived across the secondary winding 33. Hence, there is effectively provided two independently adjustable orthogonal components of a balancing voltage which may be adjusted with slugs 35 and 36 so as to completely cancel any inherent unbalance in the voltage derived across the connected together secondary windings 31 and 32 when the associated transformers should be in the balanced condition.

Adjusting the variable tap on auto-transformer 24 controls the current through the primaries 15, 16, 17 and 18 to the desired value as read on ammeter 23 so that proper magnetizing current for the particular test desired is supplied from A.C. signal source 25.

When material is being tested, the test signal wave-form derived across secondary windings 31 and 32 added to the balance correcting signals derived across windings 33 and 34 are coupled to amplifier 38 which provides a balanced signal output for application to vertical deflection plates 41 of oscilloscope 42. This wave-form may be visually observed on the face of oscilloscope 42 when the horizontal plates of the latter are energized by a sawtooth wave-form signal 81 derived from the balanced output of the sweep circuit 63 through the switch 65.

It is generally desired that only a single cycle of the signal wave-forms be observed upon oscilloscope 42. Accordingly, the period of the sawtooth signal wave-form 81 is preferably the same as that of the A.C. signal from signal source 25. The phase of the sawtooth wave-form 81 relative to the signal wave-form from amplifier 38 and consequently the position of the latter wave-form displayed on oscilloscope 42 is controlled by coupling a synchronizing signal for A.C. signal source 25 through transformer 27 and adjustable phase shifter 62 to sweep circuit 63. Varying the phase shift imparted by adjustable shifter 62 effects a corresponding horizontal displacement of the wave-form observed on the face of oscilloscope 42. Additionally, any conventional fly-back blanking circuit (not shown) may be provided to cut off the electron beam during the retrace portion of the cycle.

Referring to Figure 4, there is illustrated a single cycle of a typical wave-form 82 as it appears on the face of oscilloscope 42. By advancing the phase of the triggering signal with adjustable phase shifter 62, wave-form 82 appears to move on the oscilloscope tube face to the new position designated by the broken line 83. The two vertical lines 84 designate the portion of the signal wave-form 82 in which the beam is intercepted by wire 57 and to which the apparatus will respond. Thus in the original position, the apparatus responds to the maximum value of the signal wave-form. When the viewed wave-form is in the position designated by the dotted lines 83, the apparatus will respond to the minimum 85. The mode of operation by which this occurs will become apparent from the discussion below.

When switch 65 is positioned to apply the output of sweep circuit 63 to the horizontal deflection plates 64, the electron beam of tube 42 is, of course, deflected horizontally on a linear time base. The vertical deflection at each instant is determined by the output from amplifier 38 which is applied to the vertical deflection plates 41. It will be recalled, however, that the output on line 43 from amplifier is also applied through blocking capacitor 72' and potentiometer 73 to control the intensity of the electron beam so as to render this intensity proportional at each instant to the amount of vertical deflection. The segment of the curve 82 which lies between the vertical lines 84 represents the amplitude of the vertical deflection of the electron beam as it impinges on or is intercepted by the wire 57. When the electron beam falls on wire 57, a flow of current is induced through load resistor 70 back to ground terminal 69. This flow of current produces an output pulse across resistor 70 the amplitude of which is proportional to the amount of current flow. The amount of current flow in turn is proportional to the intensity of the electron beam and hence to the amount of vertical deflection as determined by the output of amplifier 38. This output pulse from load resistor 70 may be coupled through coupling capacitor 72 to an amplifier 87 which may actuate a relay or other control or an alarm mechanism 74. Preferably amplifier 87 has a threshold of sensitivity adjusted so that it will respond only to pulses of a predetermined minimum amplitude whereby a standard of acceptable quality of the specimen being tested may be established.

In the foregoing mode of operation the apparatus operates to sample the instantaneous amplitude of a selected portion of an electrical wave-form. In other applications however, it may be desirable to determine the relative phase difference between a wave-form and a standard reference signal. One such application is, for example, described in greater detail in connection with Figure 6 of U.S. Patent No. 2,806,992, issued to me on September 17, 1957. In order to use the present apparatus to detect the phase difference between two waves, switch 65 is positioned to apply the output of adjustable phase shifter 62 directly to the horizontal deflection plates 64. When the output of amplifier 38, which is applied to the vertical deflection plates 41, is in phase with the output from phase shifter 62, the pattern produced on the face of the oscilloscope will be a straight line passing through the intersection of the horizontal and vertical deflection axes of the tube and having a slope determined by the relative amplitudes of the two signals. When these two signals are out of phase, however, the pattern produced on the face of the oscilloscope will be an ellipse such as the ellipse 90 shown in Figure 5. In the course of tracing out this ellipse the electron beam will intersect wire 57 at the two points 91 and 92. Each of these intersections will produce an output pulse across load resistor 70. The intersection at point 91 will, for example, produce a pulse such as pulse 93 having an amplitude proportional to the vertical deflection of the beam at point 91, whereas the intersection of the beam with wire 57 at point 92 will produce a pulse such as 94 having an amplitude proportional to the amount of vertical deflection at point 92. It is well known that the geometry of an ellipse such as the ellipse 90 (commonly known as a Lissajous figure) is determined by the phase relation between the two signals producing the ellipse. Therefore, it will be apparent that the amplitude relation between the pulses 93 and 94 provides a measure of the phase difference between the signals applied to the horizontal and vertical deflection plates. In the system of Figure 2, amplifier 87 is shown as adapted simply to respond to the amplitude of the larger pulse 93, if that amplitude exceeds a predetermined minimum. It will however be obvious to those skilled in the art that one could readily use many different circuits for processing the two pulses 93 and 94 either by subtracting their amplitudes or performing any other desired operation to give a direct measure of the phase difference between the horizontal and vertical deflection signals.

It is seen that there has been provided a system which will automatically monitor a selected portion of a signal wave-form to yield a response when the monitored portion assumes a predetermined value or which will automatically monitor the phase difference between two wave-forms. It will be apparent that forms of electron beam devices, other than the illustrated oscilloscope, might also be used. The oscilloscope is preferred, however, since it permits a continuous visual monitoring of the entire wave-form, and permits the operator to readily and accurately determine which portion of the wave-form is being monitored by means of conductor 57 and associated circuitry.

While the principles of the invention have now been made clear, there will be immediately obvious to those skilled in the art, many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications within the limits only of the true spirit and scope of the invention.

I claim as my invention:

1. An electron beam device circuit comprising, means to generate a beam of electrons, means to control the intensity of said beam, first and second means to deflect said beam along first and second orthogonal axes, means connecting one of said beam deflecting means to said intensity control means to render the intensity of said beam proportional to the deflection produced by said one beam deflecting means; and means positioned to intercept said beam in a restricted area and responsive to impingement of said beam thereon to produce an output signal proportional to the intensity of said beam.

2. An electron beam device circuit comprising, means to generate a beam of electrons, means to control the intensity of said beam; first and second means to deflect said beam along first and second orthogonal axes, means connecting one of said beam deflecting means to said intensity control means to render the intensity of said beam proportional to the deflection produced by said one beam deflecting means; conductor means positioned to intercept said beam when said second deflecting means places said beam in a predetermined plane; and means to derive an output signal from said conductor means proportional to the intensity of said beam when it impinges on said conductor means.

3. In testing apparatus, a source of alternating current, a test coil coupled to said source and arranged to be loaded by a structure under test, means to derive from said coil an electrical wave-form indicative of a characteristic of said structure being tested; a cathode ray tube having means to generate a beam of electrons, means to control the intensity of said beam, first and second means to deflect said beam along first and second orthogonal axes, and a fluorescent screen on which said beam impinges to produce a visible light output; means to apply said wave-form derived from said test coil to said first beam deflecting means and to said beam intensity control means so as to render the intensity of said beam proportional to the amplitude of deflection produced by said first deflection means; conductor means positioned near said fluorescent screen to intercept said beam when said second deflecting means places said beam in a predetermined plane; and means to derive from said conductor means an output signal proportional to the intensity of said beam when it impinges on said conductor means.

4. An electron beam device circuit comprising, means to generate a beam of electrons, means to control the intensity of said beam; first and second means to deflect said beam along first and second orthogonal axes; means to apply a standard wave-form to said first deflection means, means to apply a wave-form to be analyzed to said second deflection means; display means positioned to be impinged upon by said beam and adapted to produce a visible image of the path traced by said beam; conductor means positioned near said display means to intercept said beam when said beam is positioned in a predetermined plane; means to render the intensity of said beam proportional to the deflection produced by one of said beam deflecting means; and means to derive an output signal from said conductor means, the amplitude of said output signal being proportional to the intensity of said beam when it impinges on said conductor means.

5. Apparatus as in claim 4 wherein said standard wave-form applied to said first deflection means is a saw-tooth wave-form so as to deflect said beam along one axis on a linear time base; and wherein said conductor means is positioned perpendicularly to said axis whereby the amplitude of said output signal is proportional to the amplitude of a selected portion of said unknown wave-form applied to said second beam deflecting means.

6. Apparatus as in claim 4 wherein said signals applied to said first and second beam deflecting means are both periodic wave-forms such as to cause said beam to trace a Lissajous figure; and wherein the difference in amplitude of the output pulses derived from said conductor means is a direct measure of the difference in phase between said periodic wave-forms.

7. Electrical apparatus comprising, a cathode ray tube having means to generate a beam of electrons, means to control the intensity of said beam, means to apply an adjustable bias signal to said beam intensity control means; first and second means to deflect said beam along first and second orthogonal axes, and display means to produce a visible image of the path traced by said beam; a source of a periodic signal wave-form, a source of a sweep signal whose period is an integral multiple of the period of said periodic signal wave-form, means for coupling said periodic signal wave-form to the first of said deflection means, means for applying said sweep signal to the second of said deflection means whereby said signal wave-form may be viewed upon said display means; means for coupling said periodic signal wave-form to said beam intensity control means to render the intensity of said beam proportional to the amplitude of the deflection produced by said first deflection means; conductor means positioned to intercept said beam when said second deflection means places said beam in a predetermined plane; means to derive an output signal from said conductor means proportional to the intensity of said beam and hence to the amplitude of said periodic signal wave-form when said beam impinges on said conductor means; and a work circuit connected to be responsive only to a predetermined amplitude of said output signal.

8. Magnetic testing apparatus comprising, a pair of balanced transformer detectors, means for energizing the primaries of said transformers with alternating current energy from an alternating current signal source, means for combining the signals derived across the secondary windings of said balanced transformer detectors whereby equal loading upon said transformers provides substantially zero signal across said secondaries; means for coupling the signal thus derived to a first pair of deflection plates of a cathode ray tube, means for applying a sweep signal to a second pair of deflection plates of said cathode ray tube orthogonal to said first pair whereby the signal wave-form derived across the connected together secondary windings may be viewed upon the screen of said cathode ray tube; conductor means positioned to intercept said beam when said second deflecting plates position said beam in a predetermined plane orthogonal to said screen; adjustable means for coupling said signal derived across said secondary windings of said balanced transformers detectors to said beam intensity control means; and means to derive an output signal from said conductor means proportional to the intensity of said electron beam when it impinges on said conductor means.

9. Magnetic testing apparatus comprising, a pair of balanced transformer detectors and a pair of balancing transformers with primary windings of all said transformers energized by an alternating current signal and secondary windings connected together whereby substantially equal loading upon said balanced transformers provides substantially zero signal across the connected-together secondary windings; means for controlling the current which flows through said primary windings; means for coupling the signal derived across the connected-together secondary windings to vertical deflection means of a cathode ray tube oscilloscope, a sweep circuit connected to provide a sweep signal to the horizontal deflection means of said tube; means for coupling said alternating current signal to said sweep circuit through an adjustable phase shifter to synchronize said sweep signal whereby the relative phase between said sweep signal and the signal wave-form applied to said vertical deflection plates is controlled by said adjustable phase shifter; said cathode ray tube oscilloscope further having means to generate a beam of electrons, means to control the intensity of said beam, and display means upon which said beam is adapted to impinge to produce a visible trace of the path of said beam; means comprising a blocking capacitor and a potentiometer to couple the signal applied to said vertical deflection means to said beam intensity control means to render the intensity of said beam proportional to the amplitude of the vertical deflection of said beam; conductor means positioned to intercept said beam when said horizontal deflection means places said beam in a predetermined vertical plane; means to derive from said conductor means an output signal proportional to the intensity of said beam when it impinges on said conductor means; and control means connected to be responsive only to a predetermined amplitude of said output signal.

10. In a cathode ray tube of the type having cathode means to generate a beam of electrons, grid means to control the intensity of said beam, first and second deflection means to deflect said beam along first and second orthogonal axes, and display means to produce a visible image of the path traced by said beam; the improvement comprising a conductive wire positioned in a plane parallel to said display means and extending in a straight line from one side of said display means to the other, said line passing through the intersection of the horizontal and vertical deflection axes of said tube; means comprising a load resistor connected to said wire to derive an output signal having an amplitude proportional to the intensity of said beam when said beam impinges on said wire; and means to couple a portion of the signal applied to one of said deflection means to said grid means to render the intensity of said beam proportional to the amplitude of the signal applied to said one deflection means.

No references cited.